United States Patent
Cao

(10) Patent No.: US 6,205,270 B1
(45) Date of Patent: Mar. 20, 2001

(54) DENSE WAVELENGTH DIVISION MULTIPLEXER WHICH INCLUDES A DENSE OPTICAL CHANNEL COMB FILTER

(75) Inventor: Simon X. F. Cao, San Mateo, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/401,686

(22) Filed: Sep. 23, 1999

(51) Int. Cl.$^7$ .................................................... G02B 6/26

(52) U.S. Cl. .................................. 385/24; 385/11; 385/33

(58) Field of Search ................................. 385/24, 33, 11

(56) References Cited

U.S. PATENT DOCUMENTS

| | | |
|---|---|---|
| 5,170,290 | 12/1992 | Land et al. . |
| 5,225,930 | 7/1993 | Land et al. . |
| 5,699,378 | 12/1997 | Lealman et al. . |
| 6,023,542 * | 2/2000 | Pan et al. .................................. 385/24 |

* cited by examiner

*Primary Examiner*—Hung N. Ngo
(74) *Attorney, Agent, or Firm*—Sawyer Law Group LLP

(57) ABSTRACT

The present invention provides a dense wavelength division multiplexer for separating an optical signal into optical channels which minimizes channel leakage. The multiplexer includes a mechanism for inputting an optical signal, the optical signal having a plurality of optical channels; at least one channel separator optically coupled to the inputting mechanism; at least one dense optical channel comb filter optically coupled to the at least one channel separator; and a mechanism for outputting the separated plurality of optical channels along a plurality of optical paths, optically coupled to the at least one dense optical channel separator. In the preferred embodiment, the dense optical channel comb filter includes a lens optically coupled to the input mechanism disposed at a distance equal to a focal length of the lens; a birefringent wedge optically coupled to the lens at a side opposite to the inputting means; and a non-linear interferometer optically coupled to the birefringent wedge at a side opposite to the lens. The comb filter of the present invention provides an improved efficiency of separation of channels when used to supplement an optical channel separator. The present invention also provides a higher tolerance to drifts than is provided by conventional optical filters due to the increase in the widths of the pass bands. The materials required to manufacture and implement the dense optical channel comb filter in accordance with the present invention are readily available. The present invention thus does not require special or expensive materials or processes. It is thus cost effective.

26 Claims, 8 Drawing Sheets

DENSE WAVELENGTH DIVISION MULTIPLEXER WHICH INCLUDES A DENSE OPTICAL CHANNEL COMB FILTER

FIELD OF THE INVENTION

The present invention relates to fiber optic networks, and more particularly to fiber optic dense wavelength division multiplexers.

BACKGROUND OF THE INVENTION

Fiber optic networks are becoming increasingly popular for data transmission due to their high speed and high data capacity capabilities. Multiple signals and/or wavelengths may be transmitted simultaneously over the same optical fiber. For purposes of this discussion, a signal is a single stream of logical information carried by an optical fiber and a compound signal is the totality of all such simultaneously transmitted signals. If each signal carried in a particular direction along an optical fiber corresponds to a separate wavelength, then the network is a wavelength multiplexed system.

A crucial feature of a wavelength-multiplexed fiber optic network is the separation of a compound optical signal into its component single-wavelength signals, or "channels," typically by a dense wavelength division multiplexer. This separation must occur for the exchange of wavelengths between signals on communications "loops" within networks to occur. As the demand for information carrying capacity over existing fiber networks continues to grow, the performance constraints on optical network components continue to become more severe.

One potential difficulty with optical channel separators in wavelength multiplexed systems with dense channel packing is imperfect optical separation or add-drop performance as a result of imperfections in optical components. Such imperfections would include unwanted reflections of light at nominally transparent components, unwanted transmissions of light through nominally reflective components, and light scattering from surface roughness of nominally flat surfaces. All such imperfections lead to stray light that can propagate in random and uncontrollable directions. The presence of this stray light can cause signals to propagate along undesired and incorrect pathways, thereby causing imperfect isolation of one set of signals from another. Such imperfect channel separation can cause signals to branch to incorrect portions of the network and can ultimately lead to contamination, for instance, of a signal comprising a particular wavelength channel with spurious incorrectly routed signals carried on the same channel.

As an example, FIG. 1 shows a schematic representation of optical channels as they are transmitted through a dense optical channel separator. A three-port channel separator 101 initially separates an initial optical input signal 103, comprised of a plurality of optical channels, into two sub-signals, a first sub-signal 104 comprised primarily of "odd" channels and a second sub-signal 105 comprised primarily of "even" channels, respectively. Histograms attached to each signal and sub-signal represent, hypothetically, the intensities of the channels comprising each. If the channel separator 101 is perfect then the sub-signal 104 is comprised only of odd channels and the sub-signal 105 is comprised only of even channels. However, since, in general, the separator 101 is not perfect, there is some "leakage" of even channels into sub-signal 104 and of some odd channels into sub-signal 105. Depending upon the level of isolation between sets of channels required by the wavelength multiplexed system, these spurious channel signals could provide unacceptable cross talk if, for instance, new sets of even and odd channels, respectively, are subsequently added to the sub-signals 104 and 105, as illustrated in FIG. 1.

Accordingly, there exists a need for a mechanism for minimizing channel leakage in a dense wavelength division system. The mechanism should be easy to manufacture and be cost effective. The present invention addresses such a need.

SUMMARY OF THE INVENTION

The present invention provides a dense wavelength division multiplexer for separating an optical signal into optical channels which minimizes channel leakage. The multiplexer includes a mechanism for inputting an optical signal, the optical signal having a plurality of optical channels; at least one channel separator optically coupled to the inputting mechanism; at least one dense optical channel comb filter optically coupled to the at least one channel separator; and a mechanism for outputting the separated plurality of optical channels along a plurality of optical paths, optically coupled to the at least one dense optical channel separator. In the preferred embodiment, the dense optical channel comb filter includes a lens optically coupled to the input mechanism disposed at a distance equal to a focal length of the lens; a birefringent wedge optically coupled to the lens at a side opposite to the inputting means; and a non-linear interferometer optically coupled to the birefringent wedge at a side opposite to the lens. The comb filter of the present invention provides an improved efficiency of separation of channels when used to supplement an optical channel separator. The present invention also provides a higher tolerance to drifts than is provided by conventional optical filters due to the increase in the widths of the pass bands. The materials required to manufacture and implement the dense optical channel comb filter in accordance with the present invention are readily available. The present invention thus does not require special or expensive materials or processes. It is thus cost effective.

DETAILED DESCRIPTION

The present invention provides a mechanism for minimizing channel leakage in a dense wavelength division system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A dense wavelength division multiplexer in accordance with the present invention utilizes a dense optical channel comb filter which comprises a birefringent wedge and a non-linear interferometer to minimize channel leakage. To more particularly describe the features of the present invention, please refer to FIGS. 2 through 8 in conjunction with the discussion below.

Figure 1:
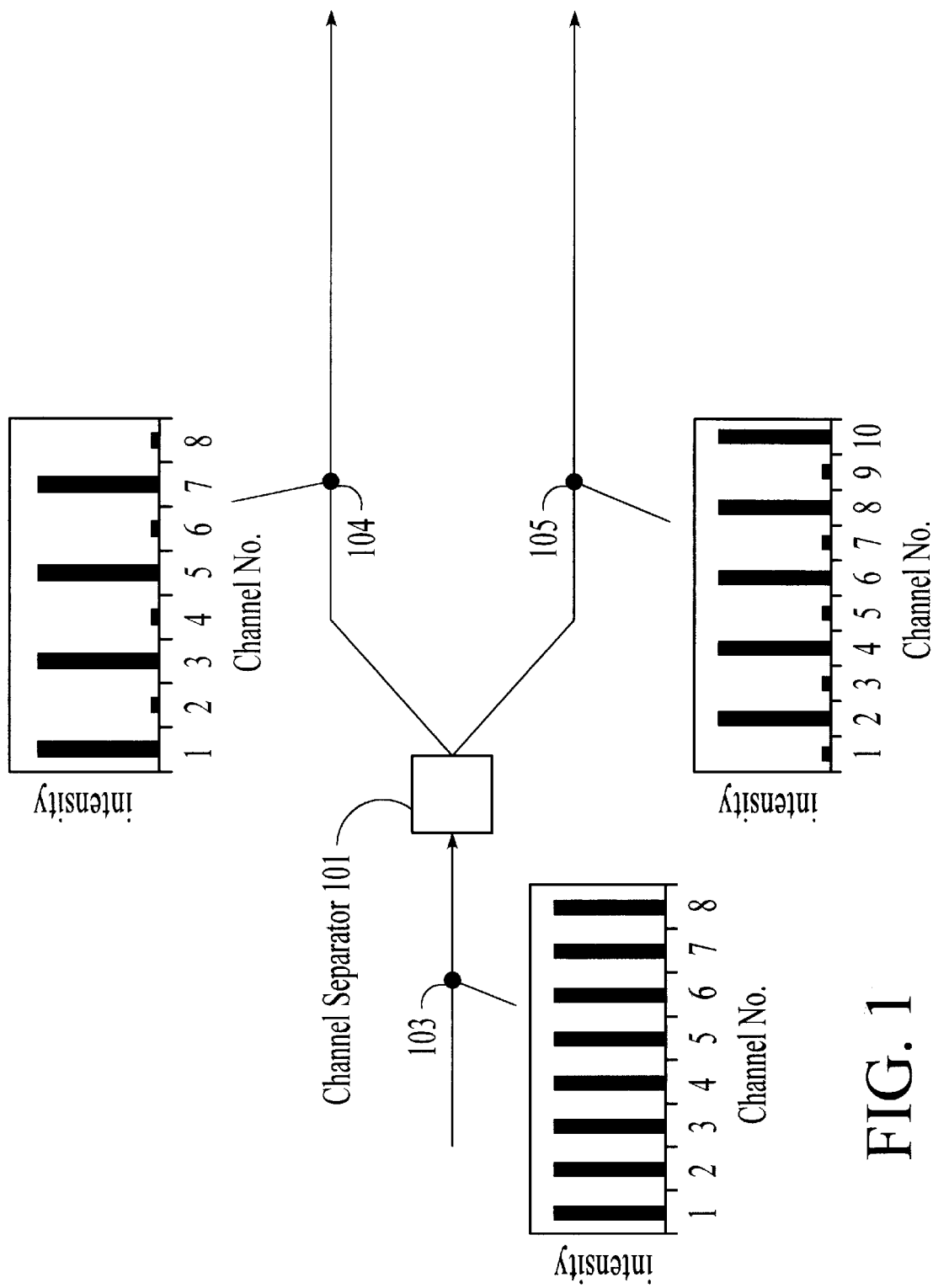
FIG. 1 is a schematic representation of optical channels are they are transmitted through a channel separator.
Figure 2:
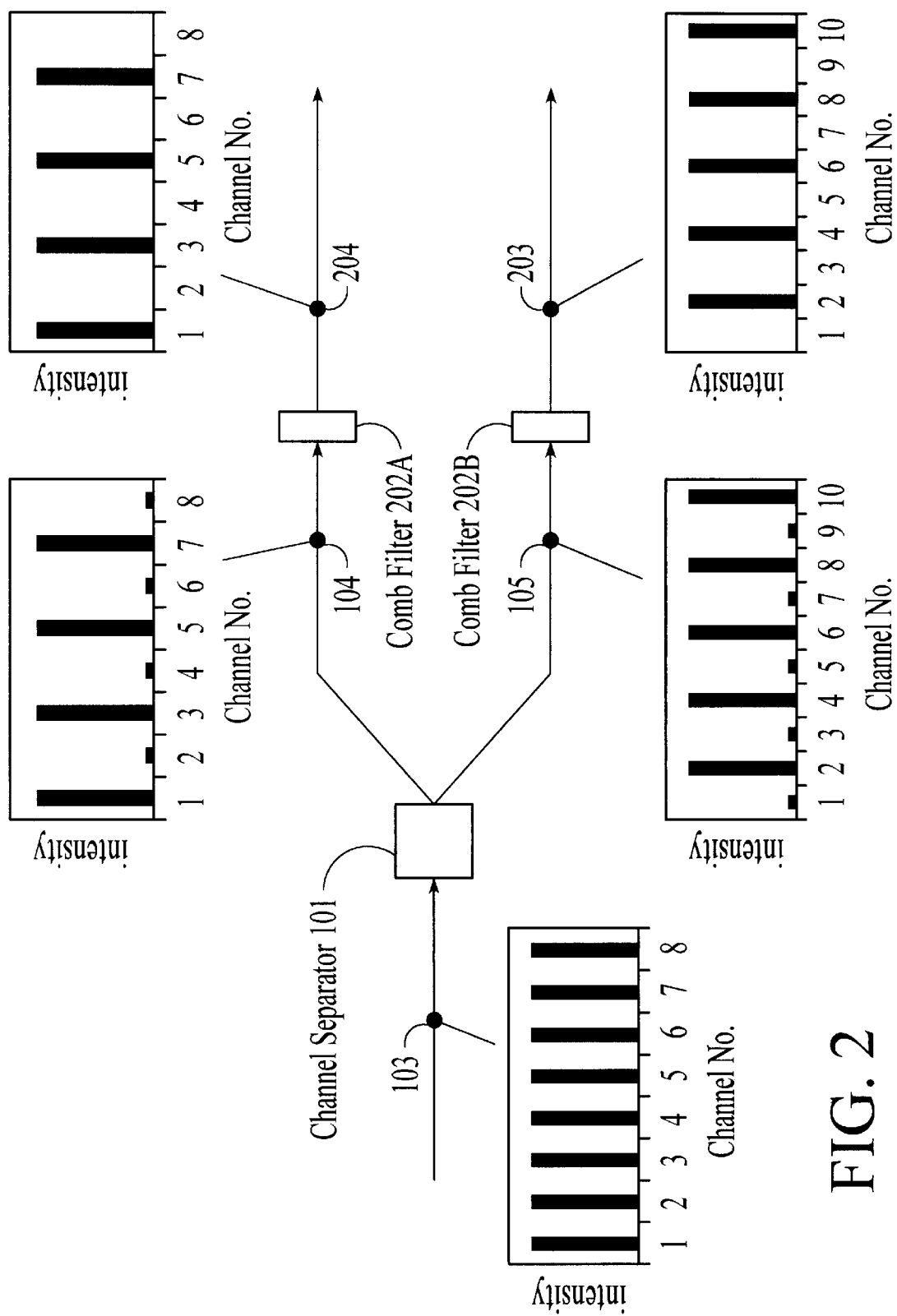
FIG. 2 is a schematic representation of optical channels as they are transmitted through a channel separator supplemented by dense optical channel comb filters in accordance with the present invention.

FIG. 2 is a schematic representation of optical channels as they are transmitted through a channel separator supplemented by dense optical channel comb filters of the present invention. To increase the degree of isolation of the odd channel sub-signal 104 from the even channels and of the even channel sub-signal 105 from the odd channels, two dense optical channel comb filters, 202A and 202B, respectively, may be inserted into the system. Each of the first and second dense optical channel comb-filters 202A and 202B transmits a high proportion of the intensity of the odd and even channels, respectively and a negligible proportion of the intensity of the even and odd channels, respectively. Taken together, the channel separator 101 and each of the dense optical channel comb filters 202A and 202B provide an acceptable level of isolation of the resulting odd channel and even channel sub-signals, 204 and 203, respectively. A separate channel separator could be used in place of each of the comb filters 202A and 202B to accomplish a similar result. However, the use of such extra channel separators would be expensive and wasteful, as the comb filters are generally of simpler design and construction than the separators.

Figure 3:
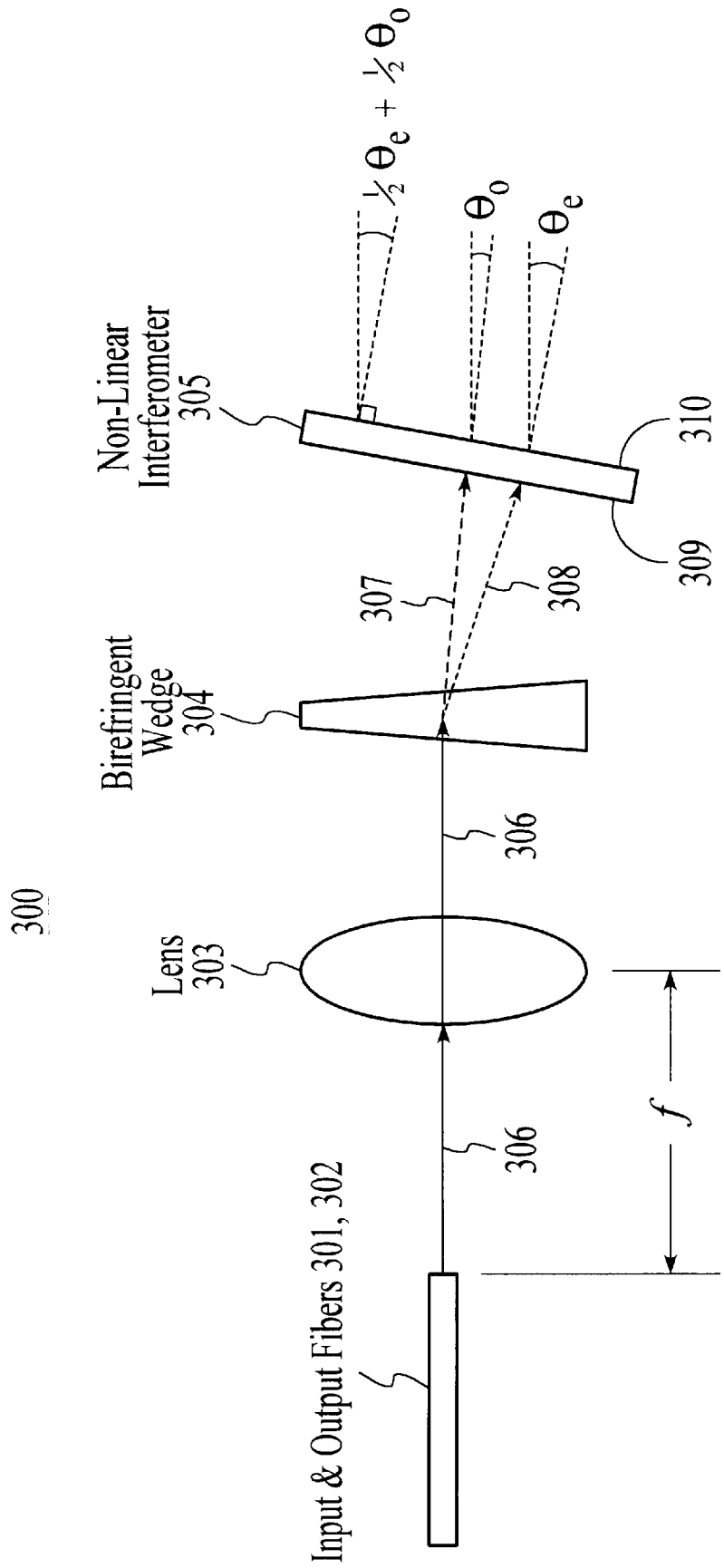
FIG. 3 is a side view of a preferred embodiment of a dense optical channel comb filter in accordance with the present invention.

FIG. 3 shows a side view of a preferred embodiment of a dense optical channel comb filter 200 in accordance with the present invention. The dense optical channel comb filter comprises two optical fibers 301, 302 mounted in parallel and disposed side by side. Fiber 301 is used for signal input and fiber 302 is used for signal output. For geometric reference, the common axis of the two fibers 301 and 302 defines the axis of comb filter 300. The comb filter 300 also comprises a lens 303, a wedge-shaped plate 304 composed of a birefringent material such as calcite or rutile, and a non-linear interferometer 305.

In the preferred embodiment, the lens 303 is disposed such that it is centered on the comb filter axis at a distance from the end faces of input fiber 301 and output fiber 302 equivalent to its focal length, f. Also, the birefringent wedge 304 is disposed along the filter axis to the opposite side of the lens 303 from fibers 301 and 302, and the non-linear interferometer 305 is disposed to the opposite side of wedge 304 from lens 303. A major dimension of the non-linear interferometer 305 is oriented at an angle to the comb filter main axis as described in more detail following.

Through the well-known double-refraction effect, the birefringent wedge 304 causes a physical decomposition of any unpolarized light beam propagating therethrough such that, after having passed through the wedge 304, the energy of the beam will be distributed among two separate beams propagating in different directions, one from the other, and plane polarized at right angles to one another. If the incident beam comprises a signal 306 as shown in FIG. 3, then the two emergent beams from wedge 304 comprise two sub-signals 307 and 308. The sub-signal 307 having the least deflection and the sub-signal 308 having the greatest deflection from the initial propagation direction of signal 306 comprise, respectively, an o-ray and an e-ray during their traverse through wedge 304. Such o-rays and e-rays are well known in the art and are not further discussed here. As shown in FIG. 3, the angles of deflection of emergent sub-signal 307 and of emergent sub-signal 308 relative to the initial propagation direction of signal 306 are defined as $\theta_o$ and $\theta_e$, respectively. In FIG. 3, as well as in subsequent figures, signal 306 is illustrated as a solid line whereas sub-signals polarized consonant with o-rays and e-rays are illustrated as dashed and dotted lines, respectively. Although each of these (sub-)signals is illustrated as a single line, it is to be understood that each of these lines represents the central axis of a beam or sheath of parallel light rays.

The non-linear interferometer 305 is an instance of an invention disclosed in a co-pending U.S. Patent Application entitled "Nonlinear Interferometer for Fiber Optic Wavelength Division Multiplexer Utilizing a Phase Differential Method of Wavelength Separation," Ser. No. 09/247,253, file on Feb. 10, 1999. Applicant hereby incorporates this patent application by reference.

Figure 4:
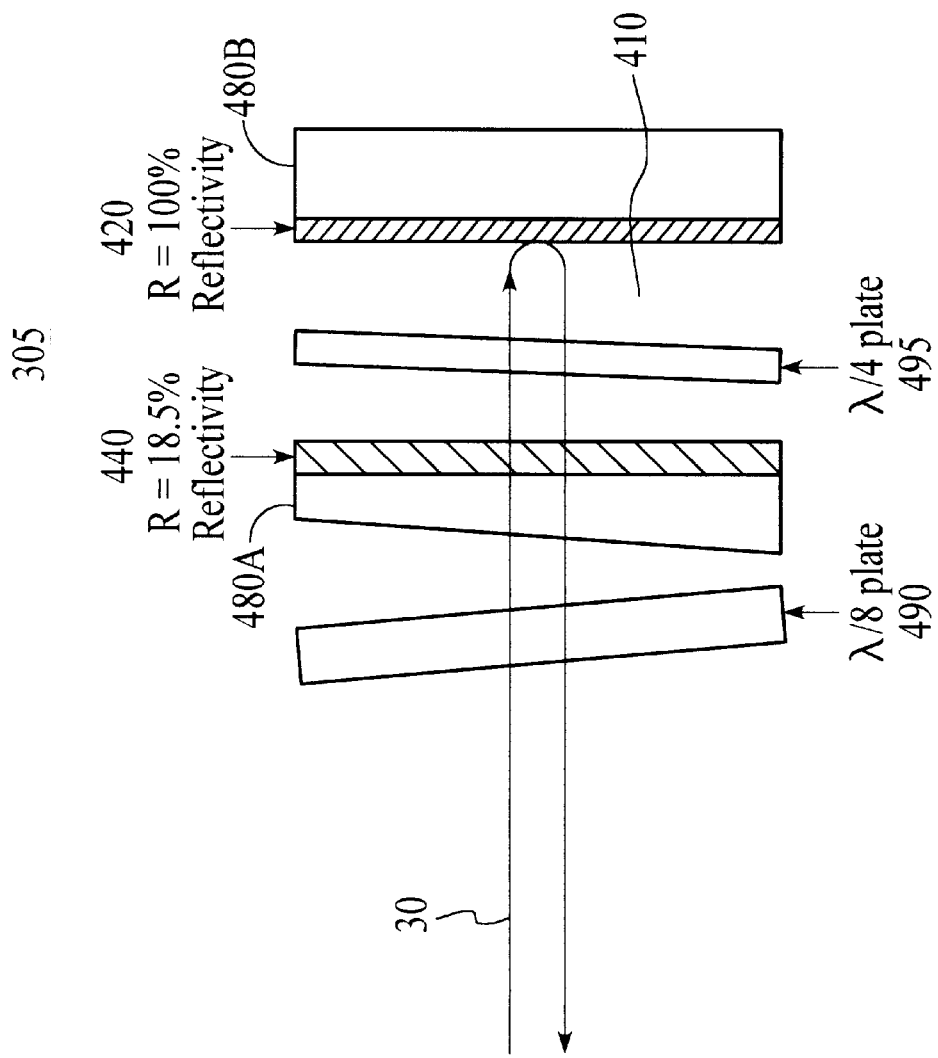
FIG. 4 is an illustration of a preferred embodiment of a non-linear interferometer in the dense optical channel comb filter of the present invention.

FIG. 4 illustrates a top view of a preferred embodiment of an interferometer disclosed in the above identified Patent Application. The interferometer 305 comprises two parallel glass plates 480A and 480B with a space or cavity 410 therebetween. The inside face of the glass plate 480B is coated with a layer of reflective coating 420 with a reflectivity preferably of 100%. The inside face of the glass plate 480A is coated with a layer of reflective coating 440 with a reflectivity preferably of approximately 18%. A quarter-wave plate is disposed within the space 410 and an eighth-wave plate is disposed adjacent to plate 480A and external to the space 410.

When signal 30 enters the interferometer 305, it passes through the 18% reflective coating 440 and a waveplate 495 preferably of $\lambda/4$. The $\lambda/4$ plate 495 introduces an 180° round trip phase change between an o-beam and e-beam of the signal inside the cavity 410, and the external $\lambda/8$ plate 490 introduces a round trip 90° phase change between the o-beam and e-beam. The waveplate 490, preferably of $\lambda/8$, fine tunes the shape of the signal 30.

Any signal light ray impinging upon non-linear interferometer 305 is entirely reflected. However, the operation of the non-linear interferometer 305 is such that plane polarized light having a wavelength corresponding to every second channel (for instance, even-numbered channels) will be reflected with a 90° rotation of its plane of polarization whereas plane polarized light having wavelengths corresponding to the remaining channels (for instance odd-numbered channels) will be reflected without a change in polarization. The non-linear interferometer 305 is comprised, in part, of parallel reflective or partially reflective surfaces 309 and 310, which are equivalent to the glass plate surfaces with coatings 440 and 420, respectively, as shown in FIG. 4. If the main or central axis of non-linear interferometer 305 is taken as the direction perpendicular to these two parallel surfaces 309 and 310, then, the non-linear interferometer 305 is oriented such that its main axis is disposed at an angle equivalent to ($\frac{1}{2}\theta_e + \frac{1}{2}\theta_o$) with respect to the initial x-axis or propagation direction of signal 306, as illustrated in FIG. 3.

Figure 5:
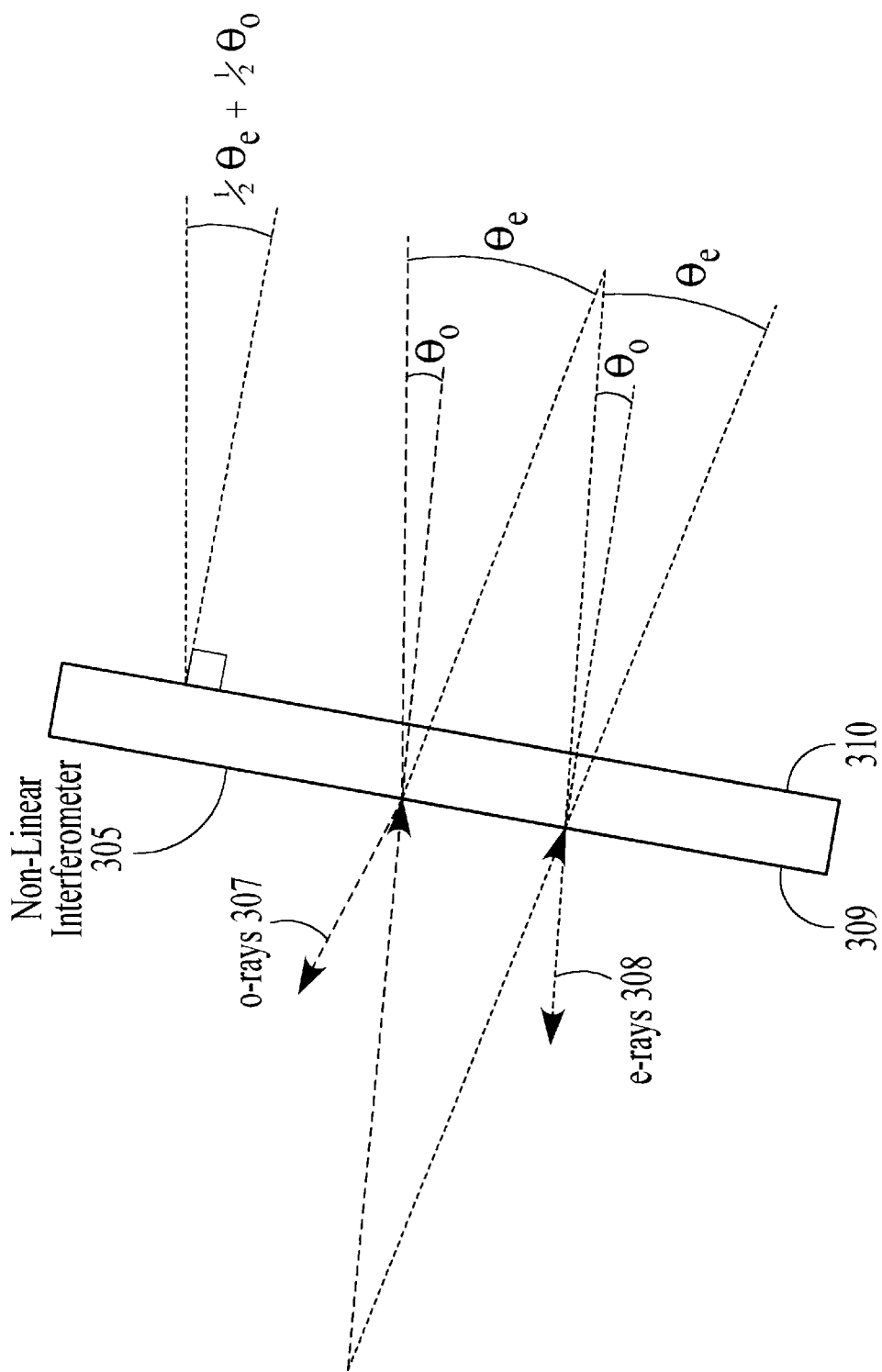
FIG. 5 is an enlarged side view of the non-linear interferometer in the preferred embodiment of the dense optical channel comb filter of the present invention.

An enlarged diagram of the non-linear interferometer 305 and the directions of sub-signal rays 307 and 308 reflected from it are shown in FIG. 5. The non-linear interferometer 305 reflects sub-signals that impinge upon it and the direction taken by the reflected portions of the sub-signals are determined as if the non-linear interferometer 305 were a simple mirror. The reflection direction is not affected by whether the sub-signals comprise odd channels or even channels. Because non-linear interferometer 305 is disposed such that its axis makes an angle of ($\frac{1}{2}\theta_e + \frac{1}{2}\theta_o$) with respect to the positive x-axis, then it is easily shown by simple geometry and the reflection law that the reflected portions of sub-signals 307 and 308 make angles of ($\pi + \theta_e$) and ($\pi + \theta_o$), respectively, with respect to the direction of the positive x-axis. That is, the reflected portions of sub-signals 307 and 308 make angles of $\theta_e$ and $\theta_o$, respectively, with respect to the x-axis, taken without regard to direction. Thus, as shown in FIG. 5, the reflected portion of sub-signal 307 is parallel to the pre-reflection portion of sub-signal 308 and the reflected portion of sub-signal 308 is parallel to the pre-reflection portion of sub-signal 307.

Figure 6:
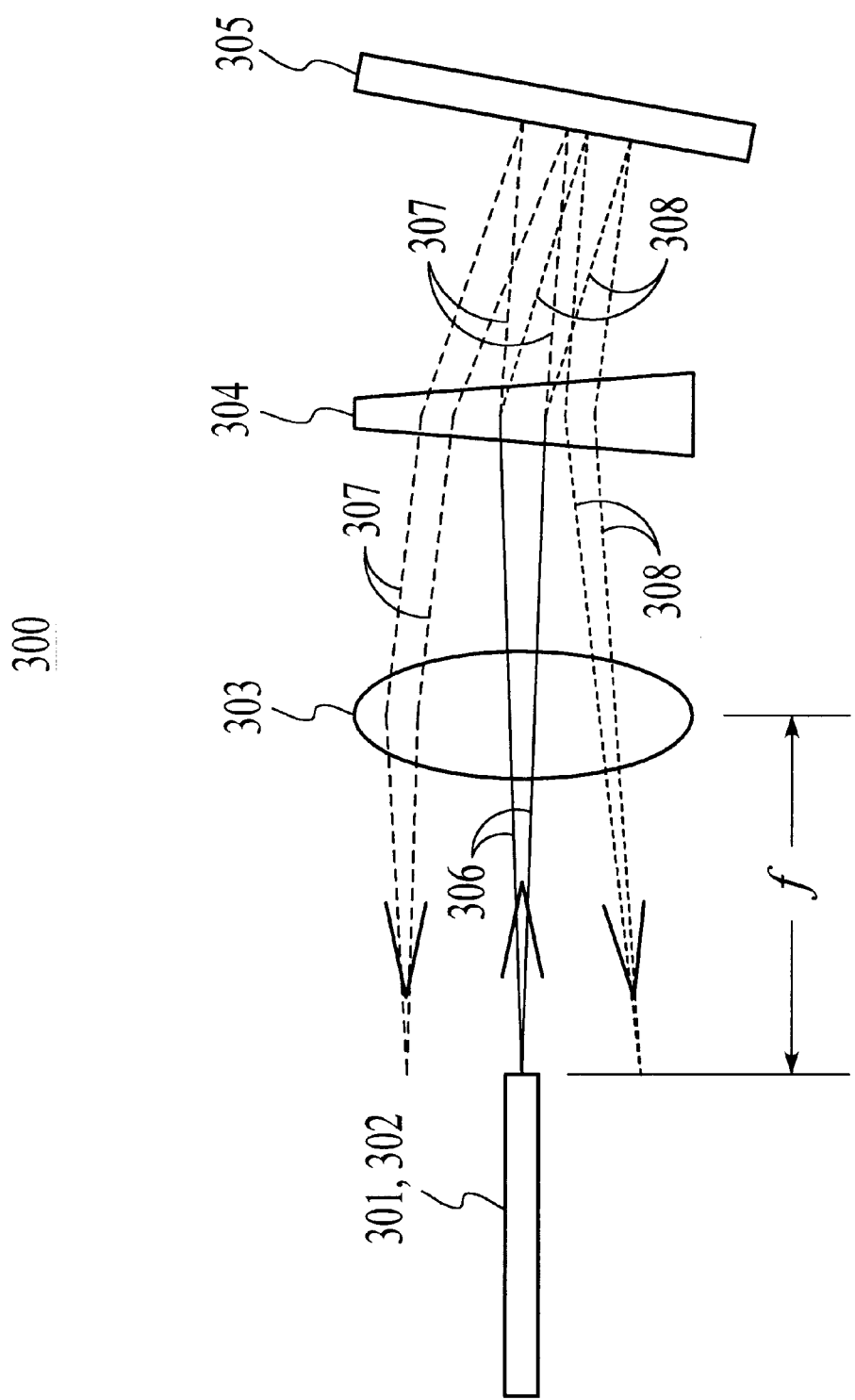
FIG. 6 is an illustration of the optical pathways of signals comprising odd channels through the preferred embodiment of the dense optical channel comb filter of the present invention.

The operation of the dense optical channel comb filter 300 is now described with reference to FIGS. 6 and 7 which illustrate the pathways of odd- and even-channel signals, respectively, through comb filter 300. In these two figures, the positive x-axis is taken as the main axis of comb filter 300 in the direction of initial propagation of signal 306. The light of signal 306 emerges from fiber 301 as a diverging cone. Because lens 303 is centered at a distance, f, from the face of fiber 301 from which this signal light emanates, the lens 303 intercepts this diverging signal 306 and collimates it into a parallel beam as shown in both FIGS. 6 and 7. After passing through lens 303, the signal 306 propagates along the positive x-axis until it is intercepted by the birefringent wedge 304. After passing through the wedge 304, the signal 306 is separated into two collimated sub-signals 307 and 308 whose propagation directions are at angles of $\theta_o$ and $\theta_e$, respectively, with respect to the positive x-axis.

The two sub-signals 307 and 308 travel to and are reflected by the non-linear interferometer 305. After reflection by non-linear interferometer 305 both sub-signals 307 and 308 pass through birefringent wedge 304 in the reverse direction. Two separate cases may be distinguished, depending upon whether sub-signals 307 and 308 belong to the set of odd channels or to the set of even channels, illustrated in FIGS. 6 and 7, respectively. If sub-signals 307 and 308 are of a wavelength belonging to the set of odd channels, then no change in polarization direction occurs during reflection by the non-linear interferometer 305. Thus, if they are of the set of odd channels, sub-signal 307 and sub-signal 308 maintain polarization directions consonant with their original identities, during their forward traverse through wedge 304, as an o-ray and an e-ray, respectively, and are thus deflected by angles of $-\theta_o$ and $-\theta_e$, respectively, during their return traverse through this wedge.

Conversely, if sub-signals 307 and 308 are of a wavelength belonging to the set of even channels, then they incur a 90° rotation of their respective polarization directions during reflection by the non-linear interferometer 305. Thus, if they are of the set of even channels, sub-signal 307 and sub-signal 308 are characterized by polarization directions consonant with e-rays and o-rays, respectively, during their return traverse through wedge 304 and are thus deflected by angles of $-\theta_e$ and $-\theta_o$, respectively, during their return traverse through this wedge. As a result, after passing through wedge 304 in the reverse direction, the odd-channel sub-signals 307 and 308 propagate along directions given by ($\pi + \theta_e - \theta_o$) > $\pi$ and ($\pi + \theta_o - \theta_e$) < $\pi$, respectively, with regard to the positive x-axis and the even-channel sub-signals 307 and 308 propagate along directions given by ($\pi + \theta_e - \theta_e$) = $\pi$ and ($\pi + \theta_o - \theta_o$) = $\pi$, respectively, with regard to the positive x-axis.

After passing through wedge 304 in the return direction, the collimated beam sub-signals 307 and 308 are intercepted by lens 303 which brings each to a focus on the side of lens 303 facing the fibers 301 and 302. As shown in FIG. 6, because the returning odd-channel sub-signals 307 and 308 do not propagate parallel to the negative x-axis prior to being intercepted by lens 303, they are brought to separate foci which do not coincide with the output fiber 302. Such sub-signals are thus lost from the system.

Figure 7:
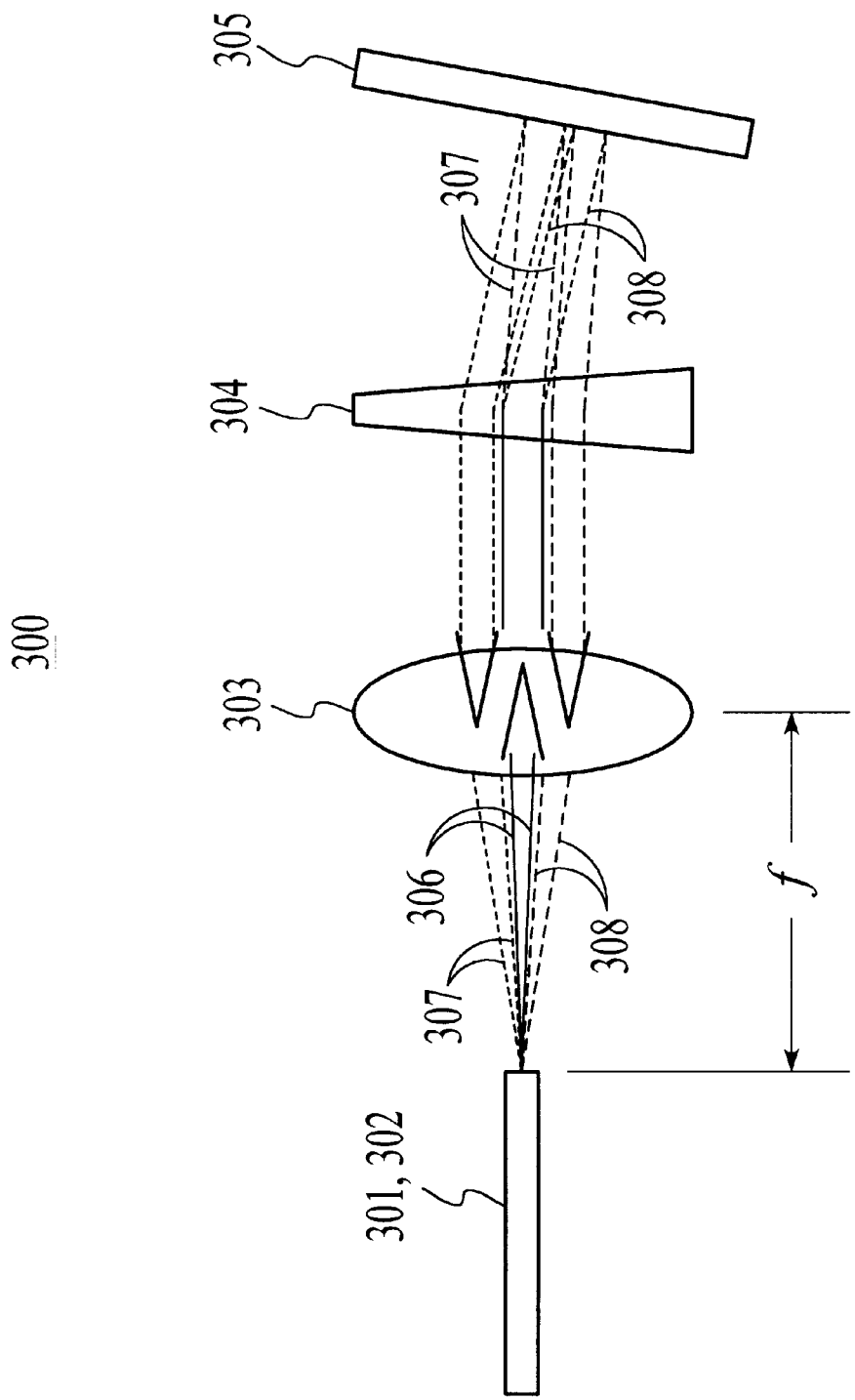
FIG. 7 is an illustration of the optical pathways of signals comprising even channels through the preferred embodiment of the dense optical channel comb filter of the present invention.

Conversely, as shown in FIG. 7, returning even-channel sub-signals 307 and 308 propagate parallel to the negative x-axis as they are intercepted by lens 303, and are thus brought to foci that are coincident with each other and also with the lens focal point. Since output fiber 302 is also disposed at the focal point of lens 303, these even-channel sub-signals are intercepted by and transferred to output fiber 302. The even-channel signals 306 are thus regenerated at output fiber 302 from the convergence of the even-channel sub-signals 307 and 308. In this manner, the filter 300 performs as a dense optical channel comb filter that transfers signals belonging to the set of even channels from input fiber 301 to output fiber 302 while simultaneously rejecting signals belonging to the odd channels.

Figure 8:
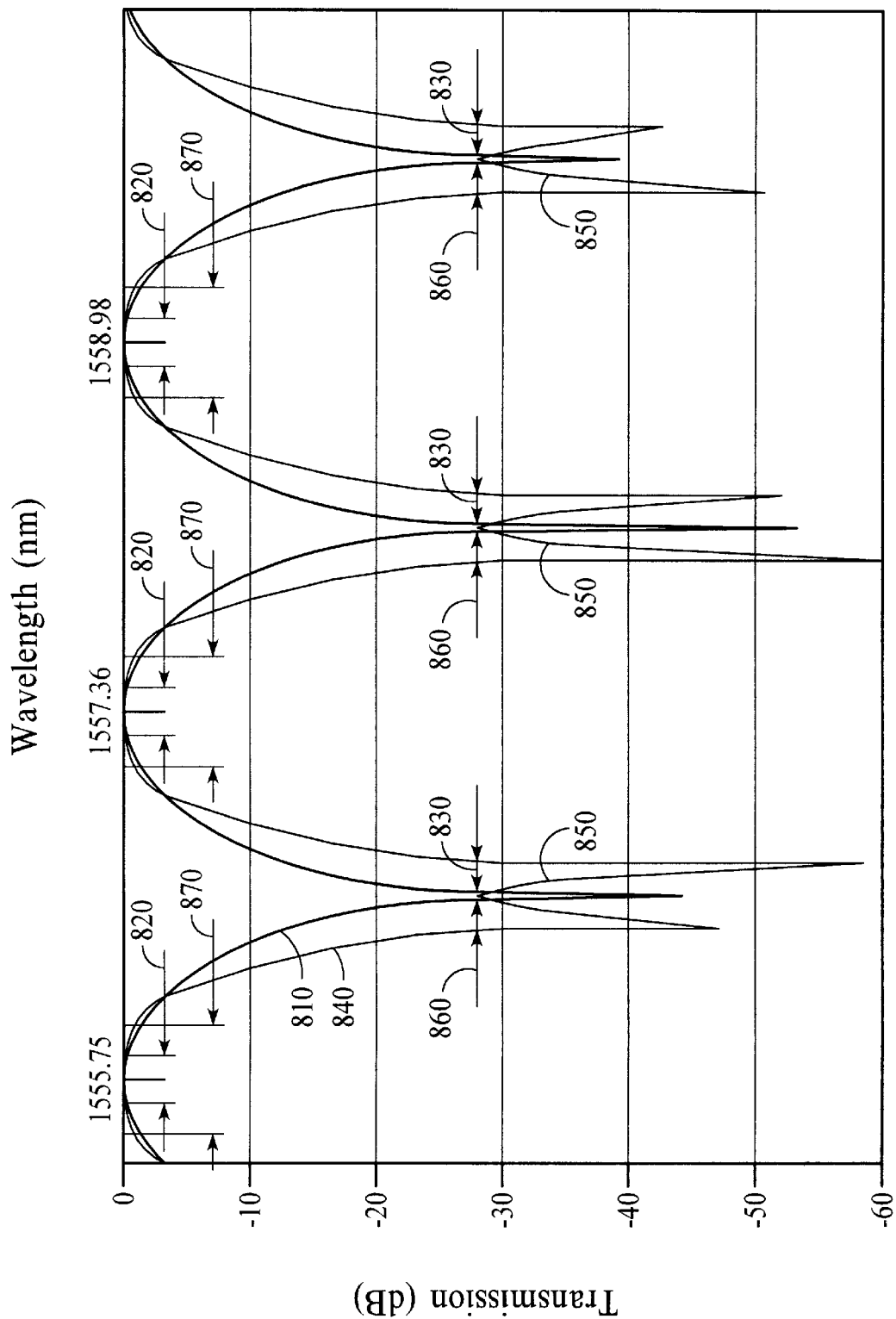
FIG. 8 is a graph of two sample spectrum curves, each comprised of several channels, as they enter, respectively, a conventional wavelength division multiplexer and a dense optical channel comb filter in accordance with the present invention.

As described above, the dense optical channel comb filter 300 of the present invention creates an advantage, when used in conjunction with a dense optical channel separator, of increased isolation of the odd channel and the even channel sub-signals from one another. Furthermore, the present invention has the added advantage of increased stability against offset and drift, in comparison to conventional optical components. This is illustrated in FIG. 8, which shows a sample spectrum curve 810 composed of numerous channels as it propagates through the components of a fiber optic communications system. Using conventional components, this composite signal must conform to a set of very narrow pass bands. Narrow pass bands of optical components are problematic because, due to the physical limitations and temperature sensitivity of signal source laser devices, they never emit light exactly at the center wavelengths of such pass bands. The difference between the actual wavelength and the wavelength at the center of the pass band is the "offset." The amount of offset or change in offset ("drift") ideally should not be larger than the widths of the pass bands. Otherwise, the crosstalk between channels will be too large.

The typical optical channel spectrum curve 810 associated with conventional components has no crosstalk but has a very narrow isolation band 830 and a very narrow pass band 820. The spectrum curve 840 of the dense optical channel comb filter 300 of the present invention has a different shape as a result of the properties of the non-linear interferometer 305 of which it the comb filter is comprised. In the spectrum curve 840, there is a small amount of band shape distortion 850, a significantly wider isolation band 860, and flatter curve tips which result in a wider pass band 870. Thus, the optical channel comb filter 300 of the present invention conforms to wider pass and isolation bands than do conventional optical components, thereby making the curve more stable and tolerant to channel offset and drift and less susceptible to cross talk.

In the preceding discussion, the dense optical channel comb filter 300 of the present invention has been described as a device that allows passage therethrough of even channels while simultaneously prohibiting passage of odd channels. However, it will be understood by one of ordinary skill in the art that this invention may also be constructed so as to allow passage of odd channels while prohibiting passage of even channels without departing from the spirit and scope of the present invention. Such a modification is readily performed by adjusting the properties of the non-linear interferometer 305 such that, for instance, light rays of wavelengths corresponding to odd channels are reflected therefrom with polarization rotation whilst light rays of wavelengths corresponding to even channels are reflected therefrom without polarization rotation. Indeed, the use of "odd channel" and "even channel" terminology in this specification is made for the convenience of the reader only and does not imply restriction of the present invention to any particular optical channel enumeration scheme or wavelength spacing. Adaptation of the present invention for use with any one of numerous optical channel configurations and or systems will be understood by one of ordinary skill in the art and is within the spirit and scope of the present invention.

A mechanism for minimizing channel leakage in a dense wavelength division system has been disclosed. The mechanism of the present invention uses a dense channel comb filter which comprises a birefringent wedge and a non-linear interferometer to minimize channel leakage. The dense optical channel comb filter of the present invention separates an optical signal into optical channels and transmits every second channel and eliminates all other channels. The present invention provides an improved efficiency of separation of channels when used to supplement an optical channel separator. The present invention also provides a higher tolerance to drifts than is provided by conventional optical filters due to the increase in the widths of the pass bands. The materials required to manufacture and implement the dense optical channel comb filter in accordance with the present invention are readily available. The present invention thus does not require special or expensive materials or processes. It is thus cost effective.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dense wavelength division multiplexer for separating an optical signal into optical channels, comprising:
   means for inputting an optical signal, the optical signal comprising a plurality of optical channels;
   at least one channel separator optically coupled to the inputting means;
   at least one dense optical channel comb filter optically coupled to the channel separator; and
   means for outputting the separated plurality of optical channels along a plurality of optical paths, optically coupled to the at least one dense optical channel comb filter.

2. The multiplexer of claim 1, wherein the inputting means comprises at least one optic fiber.

3. The multiplexer of claim 1, wherein the outputting means comprises at least one optic fiber.

4. The multiplexer of claim 1, wherein the at least one dense optical channel comb filter comprises:
   a lens optically coupled to the inputting means disposed at a distance equal to the focal length of the lens;
   a birefringent wedge optically coupled to the lens at a side opposite to the inputting means; and
   a non-linear interferometer optically coupled to the birefringent wedge at a side opposite to the lens.

5. The multiplexer of claim 4, wherein the non-linear interferometer is tilted.

6. The multiplexer of claim 4, wherein the non-linear interferometer comprises:
   a first glass plate optically coupled to a second glass plate, forming a cavity;
   a first reflective coating residing inside the cavity and on the second glass plate;
   a second reflective coating residing inside the cavity and on the first glass plate;
   a first waveplate residing inside the cavity between the first and second glass plates; and
   a second waveplate residing outside the cavity and optically coupled to the first glass plate.

7. The multiplexer of claim 6, wherein the first reflective coating comprises a reflective coating with a reflectivity of 100%.

8. The multiplexer of claim 6, wherein the second reflective coating comprises a reflective coating with a reflectivity of approximately 18%.

9. The multiplexer of claim 6, wherein the first waveplate comprises a $\lambda/4$ waveplate.

10. The multiplexer of claim 6, wherein the second waveplate comprises a $\lambda/8$ waveplate.

11. A dense wavelength division multiplexer for separating an optical signal into optical channels, comprising:
    means for inputting an optical signal, the optical signal comprising a plurality of optical channels;
    at least one channel separator optically coupled to the inputting means;
    at least one dense optical channel comb filter, comprising
       a lens optically coupled to the at least one channel separator disposed at a distance equal to the focal length of the lens,
       a birefringent wedge optically coupled to the lens at a side opposite to the at least one channel separator, and
       a non-linear interferometer optically coupled to the birefringent wedge at a side opposite to the lens; and
    means for outputting the separated plurality of optical channels along a plurality of optical paths, optically coupled to the at least one dense optical channel comb filter.

12. The multiplexer of claim 11, wherein the inputting means comprises at least one optic fiber.

13. The multiplexer of claim 11, wherein the outputting means comprises at least one optic fiber.

14. The multiplexer of claim 11, wherein the non-linear interferometer is tilted.

15. The multiplexer of claim 11, wherein the non-linear interferometer comprises:
    a first glass plate optically coupled to a second glass plate, forming a cavity;

a first reflective coating residing inside the cavity and on the second glass plate;

a second reflective coating residing inside the cavity and on the first glass plate;

a first waveplate residing inside the cavity between the first and second glass plates; and a second waveplate residing outside the cavity and optically coupled to the first glass plate.

16. The multiplexer of claim 15, wherein the first reflective coating comprises a reflective coating with a reflectivity of 100%.

17. The multiplexer of claim 15, wherein the second reflective coating comprises a reflective coating with a reflectivity of approximately 18%.

18. The multiplexer of claim 15, wherein the first waveplate comprises a $\lambda/4$ waveplate.

19. The multiplexer of claim 15, wherein the second waveplate comprises a $\lambda/8$ waveplate.

20. A dense optical channel comb filter for minimizing channel leakage, comprising:

a lens optically coupled to an inputting means disposed at a distance equal to a focal length of the lens;

a birefringent wedge optically coupled to the lens at a side opposite to the inputting means; and a non-linear interferometer optically coupled to the birefringent wedge at a side opposite to the lens.

21. The filter of claim 20, wherein the non-linear interferometer is tilted.

22. The filter of claim 20, wherein the non-linear interferometer comprises:

a first glass plate optically coupled to a second glass plate, forming a cavity;

a first reflective coating residing inside the cavity and on the second glass plate;

a second reflective coating residing inside the cavity and on the first glass plate;

a first waveplate residing inside the cavity between the first and second glass plates; and a second waveplate residing outside the cavity and optically coupled to the first glass plate.

23. The filter of claim 22, wherein the first reflective coating comprises a reflective coating with a reflectivity of 100%.

24. The filter of claim 22, wherein the second reflective coating comprises a reflective coating with a reflectivity of approximately 18%.

25. The filter of claim 22, wherein the first waveplate comprises a $\lambda/4$ waveplate.

26. The filter of claim 22, wherein the second waveplate comprises a $\lambda/8$ waveplate.

* * * * *